United States Patent
Hapka et al.

[11] Patent Number: 5,730,873
[45] Date of Patent: Mar. 24, 1998

[54] METHOD FOR PRECIPITATING A SOLID PHASE OF METAL

[75] Inventors: Alison Marie Hapka, Chadds Ford, Pa.; Joyce May Whang; Jeffery Scott Thompson, both of Wilmington, Del.

[73] Assignee: E. I. Du Pont de Nemours and Company, Wilmington, Del.

[21] Appl. No.: 703,609

[22] Filed: Aug. 27, 1996

Related U.S. Application Data

[60] Provisional application No. 60/002,957, Aug. 29, 1995.

[51] Int. Cl.$^6$ .................................................. C02F 1/62
[52] U.S. Cl. ..................... 210/632; 210/725; 166/294; 166/300; 252/181
[58] Field of Search ........................... 210/632, 724, 210/725, 730; 252/180, 181; 166/292, 294, 300; 435/281

[56] References Cited

U.S. PATENT DOCUMENTS

| | | | |
|---|---|---|---|
| 2,146,480 | 2/1939 | Kennedy | 166/21 |
| 2,238,930 | 4/1941 | Chamberlain et al. | 166/21 |
| 3,614,985 | 10/1971 | Richardson | 166/294 |
| 3,732,927 | 5/1973 | Richardson | 166/294 |
| 3,747,677 | 7/1973 | Richardson | 166/293 |
| 3,797,575 | 3/1974 | Dill et al. | 166/282 |
| 3,850,249 | 11/1974 | Hess | 166/295 |
| 4,002,204 | 1/1977 | Cavin | 166/294 |
| 4,004,428 | 1/1977 | Tazawa et al. | 61/36 C |
| 4,024,917 | 5/1977 | Martin | 166/292 |
| 4,066,541 | 1/1978 | Sando et al. | 210/632 |
| 4,230,183 | 10/1980 | Kalfoglou | 166/274 |
| 4,287,951 | 9/1981 | Sydansk et al. | 166/281 |
| 4,701,261 | 10/1987 | Gibbs et al. | 210/632 |
| 5,244,043 | 9/1993 | Shuler | 166/292 |
| 5,372,732 | 12/1994 | Harris et al. | 166/300 |
| 9,365,797 | 1/1972 | Battistoni | 210/632 |

*Primary Examiner*—Thomas G. Wyse

[57] ABSTRACT

The invention herein provides a method for the time delayed precipitation of a solid phase of metal from a low pH, metal salt solution comprising adding to the metal solution a substrate, such as an amide, and an enzyme, such as an amidase, which will react with the substrate, which causes a rise in pH upon the reaction of the substrate with the enzyme. The rise in pH causes the metal to precipitate from solution. The precipitated metal is useful for emplacing metal hydroxides for providing sorptive material useful for removing contamination from groundwater.

20 Claims, 2 Drawing Sheets

METHOD FOR PRECIPITATING A SOLID PHASE OF METAL

This application claims the priority benefit of U.S. Provisional Application 60/002,957, filed Aug. 29, 1995.

FIELD OF THE INVENTION

This invention relates to methods for precipitating a solid phase of metal. This invention specifically relates to methods for time-delayed precipitation of a solid phase of metal in a permeable media.

BACKGROUND

Contaminants can be removed from subsurface groundwater if the groundwater passes through zones of sorptive or reactive materials. Iron hydroxides have good sorptive properties for many common contaminants. Because of these sorptive properties, many investigators have developed coated materials to remove contaminants.

Joshi et al., (*J. Environ. Eng.* (*NY*) 122(8), 769–771, (1996)) tested an iron hydroxide coated sand as a method of removing arsenic III and arsenic V from groundwater. This method is a low cost method of removing arsenic. It involved coating sand with $Fe(NO_3)_3 \cdot 9H_2O$. This coated sand was placed in a column apparatus and groundwater passed through it. This coated sand can be regenerated with a wash of sodium hydroxide.

Another author who studied the sorptive properties of iron hydroxides was Maeda et al., (*Separation Science and Technology*, Vol. 25, No. 5, 547–555 (1990)). They tested iron III hydroxide loaded coral limestone as an adsorbent for arsenic V in aqueous solutions. Maeda et al., (1990, supra) found that adsorption was mostly unaffected by changes in pH in the range of 2 to 10 and was also mostly unaffected by the addition of anions such as chloride, nitrate, sulfate, perchlorate and acetate in aqueous solutions. When phosphate was added there was a decrease in the adsorption of arsenic. Maeda et al., (*Separation Science and Technology*, Vol. 27, No. 5, 681–689 (1992)) found that unloaded coral was effective as an adsorbent for arsenic V when iron III co-existed with the arsenic in an aqueous solution.

Morrison et al., (*Groundwater*, 34 (1) 75–83 (1996)) studied the adsorption of amorphous ferric oxyhydroxide coated on alluvial gravel. This material is an effective adsorbent for uranium, molybdenum and other inorganics. The authors constructed a barrier with this material and it was able to remove U to concentrations less than 0.05 mg/L and Mo to concentrations less than 0.01 mg/L.

The invention described in this patent provides an alternative method for emplacing iron precipitates. Other patents describe other methods for emplacing metal precipitates, primarily for enhanced oil recovery applications.

One example is Chamberlain et al., U.S. Pat. No. 2,238,930. This patent discloses a process in which a metal solution, with a stabilizing agent, is brought into contact with alkaline material, such as calcerous earth or rock of a well formation, or alkaline well fluids. By contact with the alkaline material, the metal precipitates as a water-insoluble precipitate. The stabilizing agent raises the pH at which the metal will precipitate, thus preventing premature precipitation. Alternatively, if alkaline material is not present in the formation to be treated, Chamberlain et al. requires that a suitable alkaline solution be injected into the formation either before or after the metal salt solution. In this way, the injection is a two-step process.

Richardson, U.S. Pat. No. 3,747,677, discloses a process for plugging a permeable region which involves injecting a fluid which contains a dissolved salt of a polyvalent metal that forms a gelatinous metal hydroxide, a dissolved pH-increasing reactant and a dissolved reactive mixture of halide ions and at least one epoxide. The exact composition is correlated with respect to the temperature in the permeable region. Hydroxyhalogenation of the epoxide occurs at temperatures in the range of 70° F. to 130° F. and increases the hydroxy ion concentration, thus raising the pH. The rise in pH causes the metal to precipitate. At temperatures above 130° F., no precipitation occurs. This process has the disadvantage of requiring epoxides, many of which are harmful to the environment.

Richardson, U.S. Pat. No. 3,614,985, as well as U.S. Pat. No. 3,732,927, discloses a process for reducing the permeability of an earth formation by injecting a fluid that forms a plugging material within the earth formation. The injected fluid is an aqueous solution that has a relatively low pH and contains a dissolved salt of a metal that forms a gelatinous, hydrous or hydrated metal oxide or hydroxide at a higher pH, and a dissolved material that reacts within the solution to raise the pH of the solution. One dissolved material disclosed is urea which is degraded at the high temperatures of subterranean earth formations, thus raising the pH.

It is an object of the present invention to provide an environmentally-friendly, one step method for injecting a solid phase of metal into a permeable volume by time delayed precipitation.

SUMMARY OF THE INVENTION

This invention provides a method for the time delayed precipitation of a solid phase of metal from a low pH, metal salt solution, comprising, adding to the metal salt solution a substrate and an enzyme which will react with the substrate, such that the substrate will cause a rise in pH upon reaction with the enzyme, and the rise in pH will cause the metal to precipitate from solution. The precipitation is conducted at a temperature in the range of about 40° F. to about 80° F.

This invention provides a method for the time delayed precipitation of a solid phase of metal in a permeable volume, from a low pH, metal salt solution, wherein the solid phase of metal serves as an adsorptive or reactive material, comprising, (a) adding to the metal salt solution a substrate and an enzyme which will react with the substrate, such that the substrate will cause a rise in pH upon reaction with the enzyme, and the rise in pH will cause the metal to precipitate from solution; and (b) emplacing the solution in the permeable volume.

This invention further provides a method for precipitating a solid phase of metal from a metal solution containing a chelating agent, wherein the chelating agent is necessary to keep the metal in solution, comprising:

This invention also provides an aqueous solution for precipitating a solid phase of metal, comprising:

I. (a) a low pH, metal solution; (b) a stabilizing agent; (c) an alkaline agent; (d) urea; and II. urease;

wherein, I and II are combined just prior to emplacing the solution.

It is to be understood that the foregoing general description and the following detailed description are exemplary and explanatory only and are not restrictive of the invention as claimed.

DETAILED DESCRIPTION OF THE FIGURES

Figure 1:
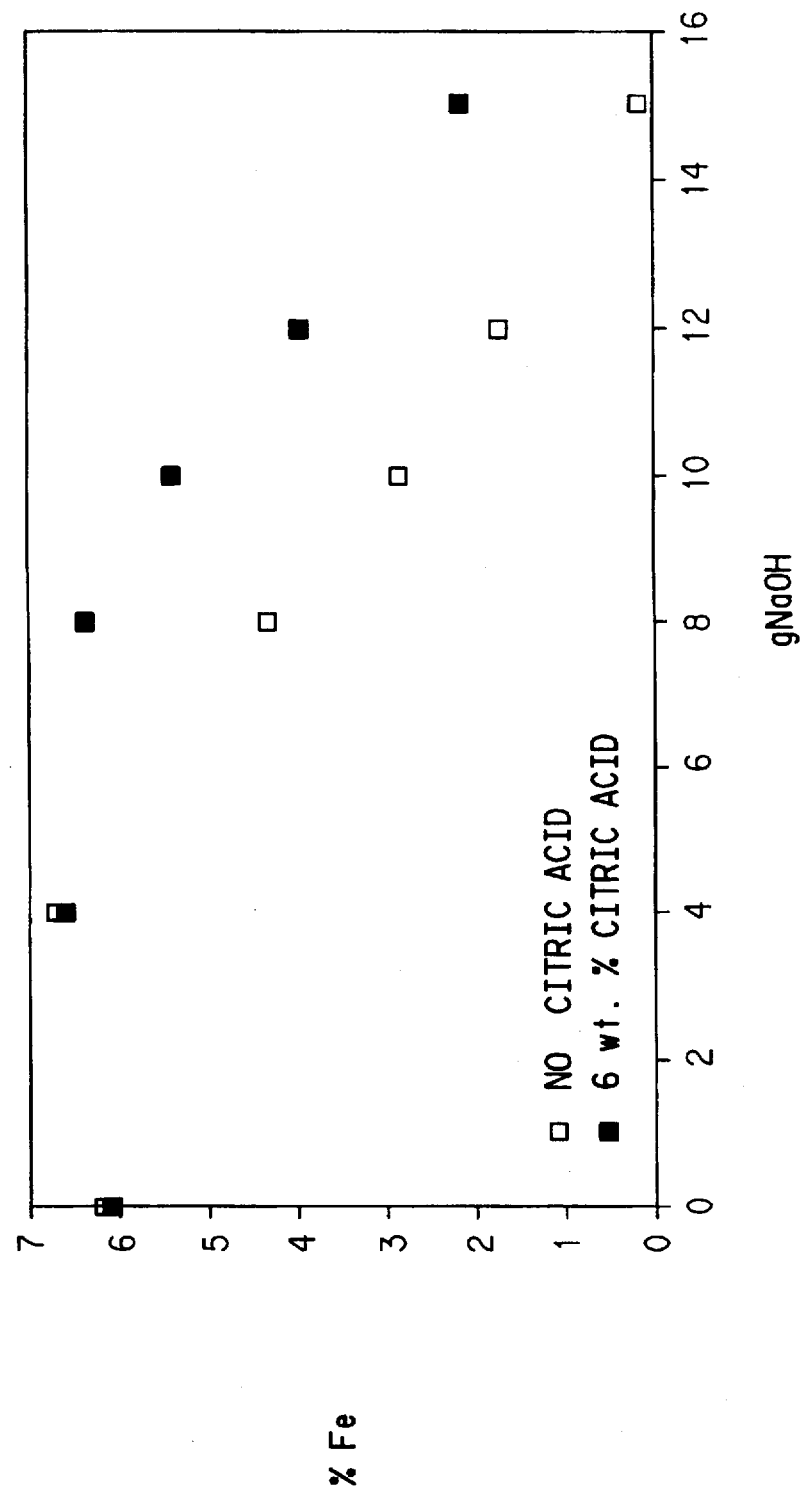
FIG. 1 is a plot of the percent dissolved iron versus the amount of neutralizer added to the solution for an iron solution that is being partially neutralized either with or without citric acid as a chelating agent.

FIG. 1 shows a plot of data for a high concentration iron sulfate solution that is neutralized with sodium hydroxide either with or without chelating agent. This plot shows the effect of the chelating agent maintaining iron in solution to a higher pH. Each datapoint on this plot represents a separate sample. Each sample was 100 mL in volume.

Figure 2:
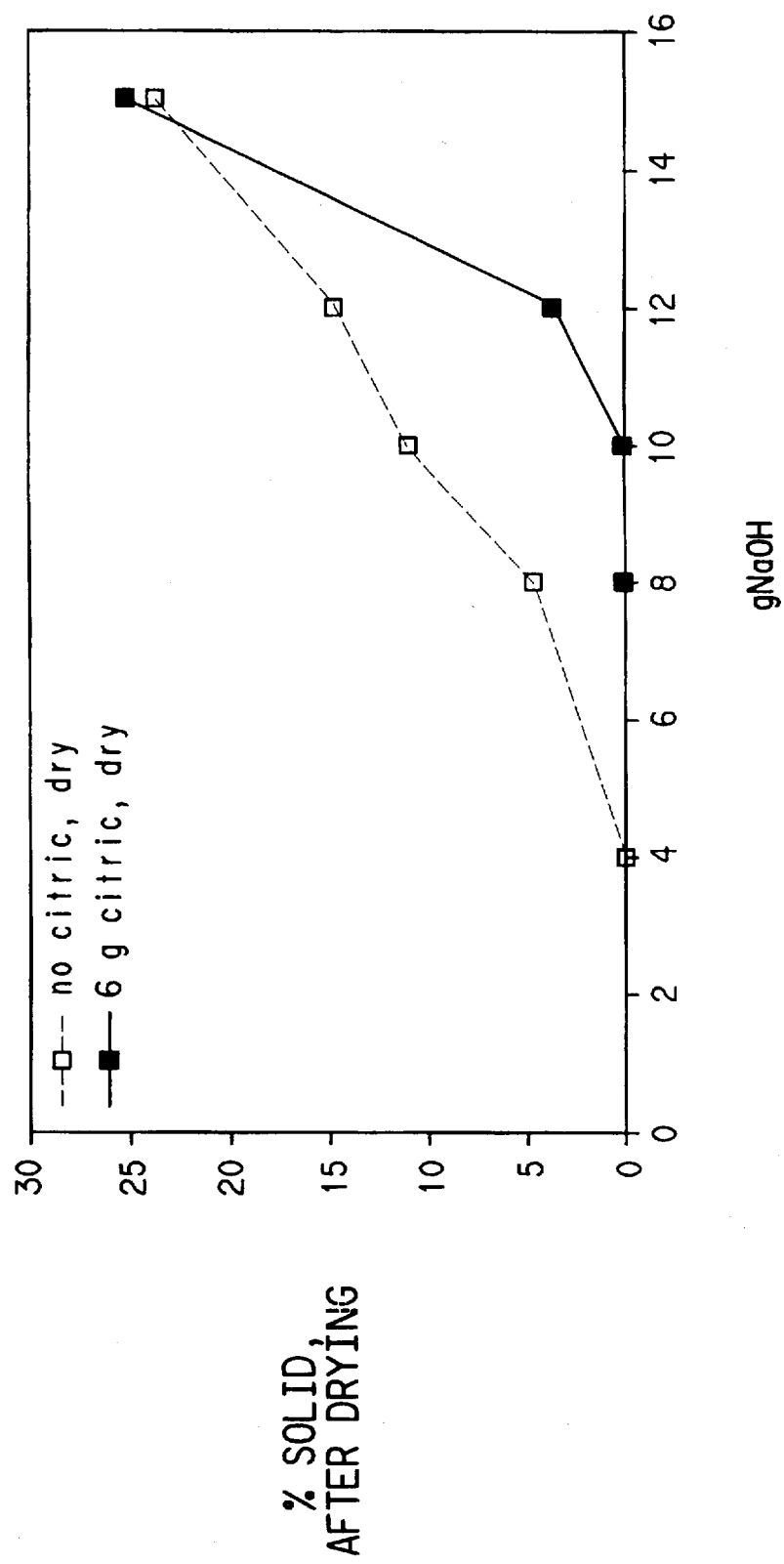
FIG. 2 is a plot of the percent solids versus the amount of neutralizer added to the solution for an iron solution that is neutralized either with or without citric acid as a chelating agent.

FIG. 2 shows a plot of data for a high concentration iron sulfate solution that is neutralized with sodium hydroxide either with or without a chelating agent. This data is for the same series of samples for which data is plotted in FIG. 1.

DETAILED DESCRIPTION OF THE INVENTION

To achieve the objectives and in accordance with the purpose of the invention, as embodied and broadly described herein, the invention provides a method for precipitating a solid phase of metal from a low pH metal solution. By "solid phase of metal" is meant a precipitated metal salt, such as, but not limited to, metal hydroxides and metal oxides. By "low pH metal solution" is meant an aqueous metal solution having an acidic pH, wherein the pH is sufficiently low to keep an adequate amount of the particular metals present in solution. For providing a sorptive material, the amount is adequate when a sufficient amount of metal precipitate is produced to sorb the amount of contamination expected to pass through the metal precipitate.

The method of this invention includes adding a substrate, and an enzyme which will react with the substrate, to the metal solution. An enzyme may be defined as a protein with catalytic properties due to its power of specific activation. An enzyme both lowers the energy of activation of, and directs the steps in a pathway of chemical reactions. A substrate is the specific chemical compound which can react with, or be enzymatically decomposed, by a corresponding enzyme. The substrate and corresponding enzyme should be chosen such that decomposition of the substrate by the enzyme will cause a rise in pH. The rise in pH will then cause the metal to precipitate from solution.

There are advantages to using a substrate/enzyme additive to raise the pH, as opposed to conventional methods. Generally, decomposition of the substrate occurs slowly over time, allowing time for introduction of the solution into the permeable volume before the metal precipitates. In this way, the precipitation of the solid phase of metal is time delayed. The amount of time delay is controlled by the amount of enzyme added; more enzyme generally causes less delay. A further advantage, the method of this invention is generally useful in the temperature range of about 40° F. to about 80° F., and does not require the addition of heat.

Additionally, substrate/enzyme combinations can be chosen which are environmentally friendly, and thus more suitable for soil applications. For example, urea and urease is an example of a benign yet effective substrate/enzyme additive. Urease hydrolyzes urea into $CO_2$ and $NH_3$. When $NH_3$ is released into an acid solution it adsorbs an $H^+$ ion, which causes the pH to increase. By carefully controlling the amount of urease added to the solution, the time required to increase the pH can be controlled. Preferably, the enzyme is added just prior to introduction into the permeable volume to be treated.

The method of the invention herein may also comprise the additional step of adding a stabilizing agent to the metal solution. A stabilizing agent is a material capable of raising the pH value at which a metal precipitate will form from the metal salt solution. The stabilizing agent is preferably a chelating agent. Typical chelating agents include EDTA [ethylenediamine tetraacetic acid], sodium citrate, citric acid, acetic acid and lactic acid. The metal solutions may initially have very low pH's because that is the type of metal liquor available as a co-product from industrial sources. Also, very low pH solutions have higher iron concentrations which are useful for this type of system.

This invention provides certain advantages for environmental applications. The method for the time delayed precipitation of a solid phase of metal in a permeable volume, as described above, wherein the solid phase of metal serves as an adsorptive or reactive material. Contaminants in a fluid may pass through the permeable volume, thus contacting the solid phase of metal. Many precipitated metals, such as iron hydroxides, are known to have good adsorptive properties which may be helpful in adsorbing and containing the contaminants.

It is preferable if the solution to be introduced into a permeable volume has a pH higher than or equal to about 2.0. The pH of the metal solution should be compatible with the pumping equipment; also the higher the pH of the metal solution when urea and urease are added, the lower the amount of urea and urease needed to bring the pH up to a level to cause precipitation of the metals present. If the pH of the solution is below that range, it is preferable that a stabilizing agent and an alkaline agent is also added to the solution. An alkaline agent is any material that will cause a rise in pH in an aqueous solution. Typical alkaline agents include hydroxides, oxides and carbonates. Enough alkaline agent should be added to raise the pH to the desired range of about 2 or greater. NaOH, $Ca(OH)_2$, $CaCO_3$ and $Mg(OH)_2$ were found to be effective neutralizers for an iron chloride solution.

The metal salt solution may be mixed with a stabilizing agent and an alkaline agent at a time significantly in advance of when the solution will be introduced to a volume to be treated. The solution should remain relatively stable almost indefinitely, in the absence of an enzyme and depending on the components in the metal solution. Preferably, the urease should be added to the solution within about 1 to 48 hours prior to completing the emplacement of the solution into the permeable volume, since substantial precipitation will occur at this time. By "substantial precipitation" is meant that more than half of the available metal has precipitated. The amount of urease will determine how much time is available before emplacement must begin to be completed. The solution which is introduced into the permeable volume, however, is a single solution, thus only a single-step injection is needed.

The metal salt solution of this invention typically has a metal concentration in the range of about 0.1% to 10% by weight metal. Preferably the range will be about 1% to 7% metal by weight. Typical metal salts include ferric chloride, ferrous chloride, ferrous sulfate, or mixtures thereof.

Metal chloride solutions arising from industrial processes can also be used. Examples are pickle liquor, mixed metal chlorides arising from the chloride process to produce $TiO_2$ or the titanium metal and metal sulfates arising from the sulfate process used to produce $TiO_2$. Often, iron chloride will be present in an amount of at least 50, preferably at least 60 and most preferably at least 70 weight percent based upon the total amount of mixed metal chlorides present. Where the sulfate process is used, the iron sulfate is often present in an amount of at least 50, preferably at least 60 and most preferably at least 70 weight percent based upon the amount of the mixed metal sulfates present.

The exact conditions needed for a solution of this invention (e.g., amount of stabilizing agent and alkaline agent) will depend on the initial pH, and the desired amount and type of metal salt present. For iron solutions, the solubility of the iron is very dependent on the pH of the solution, and on the redox potential of the iron. At very low pH's (0 to 2), iron is in the form of either $Fe^{3+}$ or $Fe^{2+}$. At a pH of about 2, the $Fe^{3+}$ becomes $Fe(OH)_3$. Then at a pH of about 8, the $Fe^{2+}$ becomes $Fe(OH)_2$. For pH between 2 and 8, $Fe^{2+}$ becomes $Fe(OH)_3$, depending on the redox potential.

Various methods can be used to emplace the metal solution into the permeable volume to be treated. By "emplacement" is meant introducing a solution into the pores of a permeable volume. Typical methods of emplacement include jet grouting, permeation grouting or deep soil mixing. The preferred method will depend on the particular application. Where chemical grouting is needed to establish physical barriers or walls, and even floors, to contain hazardous waste, jet grouting is a useful method. For more information on emplacement methods, see Reuban Karol, *Chemical Grouting*, 2nd edition, Marcel Dekker, Inc., New York (1990); Rumer, Ralph and Michael Ryan, "Barrier Containment Technologies for Environmental Remediation Applications", John Wiley and Sons, Inc., New York, 1995; and Rumer, Ralph R. and James K. Mitchell, eds; "Assessment of Barrier Containment Technologies: A Comprehensive Treatment for Environmental Remediation Applications", International Containment Technology Workshop, August 1995.

In addition, metal salts such as iron hydroxides are benign, and can be safely mixed with soils without causing additional hazards. Further, the metals may be resistant to a variety of organics, and may therefore maintain barrier properties even when subjected to some hazardous organic chemicals.

For environmental applications, those skilled in the art will appreciate that the metal solution of this invention may be mixed with additional inert components, such as cement or clays, to improve the barrier properties of the resulting grouted volume. The components or particulates added should be inert to the metal solution. One example of a metal solution that can be used to generate precipitate is iron. Iron hydroxides occur naturally in the environment in the form of minerals such as goethite. These natural minerals are stable under certain geological conditions. However, in some applications it may be useful if the additional components could react with the specific contaminant or contaminants to either degrade or sorb them. The barrier properties would be further enhanced since any waste seeping through the grouted volume would likely be degraded by the reactive material before passing entirely through. By "reactive material" is meant any material that will degrade specific contaminants upon contact, but which are inert to the metal solution.

With the addition of reactive material capable of, for example, the destruction of hazardous organic materials, deep soil mixing is a useful method of emplacing into the volume. In this way the additional components would be intimately mixed with the hazardous material, to facilitate treatment of the waste, and the entire site would be stabilized in place. Both jet grouting and permeation grouting are additional useful methods of emplacement for such an application.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLES

Example 1

This high concentration iron sulfate solution was combined with a chelating agent, either 0 g or 6 g citric acid to 100 mL iron solution, and a neutralizer, sodium hydroxide. Each sample had a different amount of sodium hydroxide added. FIG. 1 shows as the amount of neutralizer increased the percent iron in solution for samples both with and without chelating agent decreased. FIG. 2 shows that as the amount of neutralizer increased the percent solids increased for samples both with and without chelating agent.

Example 2

Three 100 mL samples were prepared to test the activity of jack bean meal in a low pH ferrous sulfate solution. Jack bean meal is a source of urease. The base solution used was 6 wt. % Fe, ferrous sulfate solution that contained 6 g citric acid, 8 g NaOH pellets and 15 g urea. Then, the following quantities of jack bean meal were added to the samples:

4.0 g, 9,600 units of activity of jack bean meal 5.0 g, 12,000 units of activity of jack bean meal 25.0 g, 60,000 units of activity of jack bean meal One unit of activity liberates 1.0 µmole of $NH_3$ from urea per minute at pH 7.0 and 25° C. The pH's of the samples were monitored over time after the jack bean meal was added.

The pH's of the samples measured before the addition of urease are listed in Table 1.

TABLE 1

| pH's of Ferrous Sulfate Before Addition of Jack Bean Meal | | | |
|---|---|---|---|
| Contents of Samples | 4.0 g Jack bean meal | 5.0 jack bean meal | 25.0 jack bean meal |
| ferrous sulfate solution only | 0.14 | 0.08 | 0.05 |
| ferrous sulfate with citric acid | 0.04 | 0.02 | 0.03 |
| ferrous sulfate with citric acid and NaOH | 3.25 | 3.19 | 3.18 |
| ferrous sulfate with citric acid, NaOH and urea | 3.38 | 3.32 | 3.33 |

Jack bean meal is a possible source of urease for the low pH iron solutions. Also, the jack bean meal seems to withstand mixing better than purified urease, and be more active in low pH solutions. There did not seem to be any remaining residue from the jack bean meal in the sample after the reaction finished.

Example 3

Urease Batch Test

This experiment was conducted to investigate the relationship between urease concentration, urea concentration and the type of neutralizer.

Three samples were prepared as shown in Table 3. The pH was measured immediately before the urease was added and the pH at the end of the test.

Approximately one day after the urease had been added to the samples, each of the samples was agitated. The pH was then measured.

TABLE 3

SAMPLE PH

| Type of Iron Solution | Citric Acid, g | Alkaline Agent | g Alkaline Agent | Urea, g | Urease, g | Initial pH | Final pH |
|---|---|---|---|---|---|---|---|
| iron chloride | 6 | Ca(OH)$_2$ | 5 | 45 | 8 | 1.20 | 8.17 |
| iron chloride | 6 | NaOH | 5 | 45 | 8 | 1.26 | 9.11 |
| iron sulfate | 6 | NaOH | 8 | 15 | 4 | 3.63 | 9.09 |

What is claimed is:

1. A method for the time delayed precipitation of a solid phase of metal from a low pH, metal salt solution, comprising, adding to the metal salt solution a substrate and an enzyme which will react with the substrate, such that the substrate will cause a rise in pH upon reaction with the enzyme, and the rise in pH will cause the metal to precipitate from solution.

2. The method of claim 1 wherein the precipitation is conducted at a temperature ranging from about 40° F. to about 80° F.

3. The method of claim 2 further comprising the step of adding a stabilizing agent to the metal salt solution.

4. The method of claim 3 further comprising the further step of adding an alkaline agent, after the addition of the stabilizing agent, to achieve a pH of at least about 2.

5. The method of claim 2 further comprising the further step of adding an alkaline agent to the metal salt solution to achieve a pH of at least about 2.

6. The method of claim 1, 2, 3, 4 or 5 wherein the substrate is an amide and the enzyme is an amidase.

7. The method of claim 6 wherein the substrate is urea and the enzyme is urease.

8. The method of claim 4 or 5 wherein the alkaline agent is selected from the group consisting of: hydroxides, oxides and carbonates, and wherein the substrate is urea and the enzyme is urease.

9. The method of claim 3 or 4 wherein the stabilizing agent is selected from the group consisting of: EDTA, sodium citrate, citric acid, acetic acid and lactic acid, and wherein the substrate is urea and the enzyme is urease.

10. The method of claim 7 wherein the metal salt concentration in the metal salt solution ranges from about 0.1% to 10% by weight.

11. The method of claim 10 wherein the metal concentration ranges from about 1% to about 7% by weight.

12. The method of claim 11 wherein the metal salt in solution is selected from the group consisting of: ferric chloride, ferrous chloride, ferrous sulfate, and mixtures thereof.

13. The method of claim 4 wherein the metal in solution comprises iron chloride or iron sulfate, the ferric and ferrous iron concentration in solution is about 6% by weight, the stabilizing agent is citric acid, the alkaline agent is sodium hydroxide, the substrate is urea and the enzyme is urease.

14. A method for the time delayed precipitation of a solid phase of metal in a permeable volume, from a low pH, metal salt solution, wherein the solid phase of metal serves as an adsorptive or reactive material, comprising, (a) adding to the metal salt solution a substrate and an enzyme which will react with the substrate, such that the substrate will cause a rise in pH upon reaction with the enzyme, and the rise in pH will cause the metal to precipitate from solution; and (b) emplacing the solution in the permeable volume.

15. The method of claim 14 wherein the surfaces of the solid phase of metal are contacted with a fluid flowing through the permeable volume, such that the surfaces of the solid phase of metal adsorb or react with contaminants in the fluid.

16. The method of claims 15 wherein a reactive material is added to the solution prior to emplacing the solution in the permeable volume.

17. The method of claims 14, 15, or 16 wherein the precipitation is conducted at a temperature ranging from about 40° F. to about 80° F.

18. An aqueous solution for precipitating a solid phase of metal in situ, comprising:

I (a) a low pH, metal solution; (b) a stabilizing agent; (c) an alkaline agent; (d) urea; and II urease;

wherein, I and II are combined just prior to emplacing the solution in a permeable volume.

19. The method of claim 1 wherein the metal salt solution is pickle liquor, mixed metal chlorides arising from the chloride process to produce TiO$_2$; or titanium metal or mixed metal sulfates arising from the sulfate process to produce TiO$_2$.

20. The method of claim 14 wherein the metal salt solution is pickle liquor, mixed metal chlorides arising from the chloride process to produce TiO$_2$; or titanium metal or mixed metal sulfates arising from the sulfate process to produce TiO$_2$.

* * * * *